United States Patent [19]
Goldenberg

[11] Patent Number: 5,921,116
[45] Date of Patent: Jul. 13, 1999

[54] VEHICLE PEDAL LOCK

[75] Inventor: Melvin Steven Goldenberg, New York, N.Y.

[73] Assignee: Bruce L. Adams, New York, N.Y.

[21] Appl. No.: 08/806,699

[22] Filed: Feb. 26, 1997

[51] Int. Cl.$^6$ .................................................. B60R 25/08
[52] U.S. Cl. .................... 70/18; 70/39; 70/52; 70/53; 70/200
[58] Field of Search .................. 70/18, 52, 53, 70/389, 39, 237, 238, 198–203

[56] References Cited

U.S. PATENT DOCUMENTS

| | | | |
|---|---|---|---|
| 711,608 | 10/1902 | Williams | 70/53 |
| 1,386,543 | 8/1921 | Tiller | 70/199 |
| 1,393,022 | 10/1921 | Hughes | 70/200 |
| 1,475,863 | 11/1923 | Pate | 70/199 |
| 1,550,092 | 8/1925 | Morton | 70/199 |
| 1,556,296 | 10/1925 | Mitchell | 70/DIG. 56 X |
| 1,560,251 | 11/1925 | De Rouville et al. | 70/200 |
| 1,571,057 | 1/1926 | Kroll | 70/53 |
| 1,579,395 | 4/1926 | Rohm et al. | 70/199 |
| 1,690,938 | 11/1928 | Maxwell | 70/38 A |
| 2,152,565 | 3/1939 | Peterson | 70/53 |
| 4,876,865 | 10/1989 | Trinidad et al. | 70/237 X |
| 4,944,168 | 7/1990 | Kortenbrede | 70/54 X |
| 5,282,373 | 2/1994 | Riccitelli | 70/202 X |
| 5,359,868 | 11/1994 | Villani | 70/237 X |

FOREIGN PATENT DOCUMENTS

| | | | |
|---|---|---|---|
| 0404709 | 12/1990 | European Pat. Off. | 70/202 |
| 2443946 | 8/1980 | France | 70/238 |
| 2681823 | 4/1993 | France | 70/202 |
| 352491 | 4/1922 | Germany . | |
| 3433686 | 3/1985 | Germany | 70/237 |
| 2063194 | 6/1981 | United Kingdom | 70/238 |
| 2255060 | 10/1992 | United Kingdom | 70/202 |
| 2263260 | 7/1993 | United Kingdom | 70/199 |

*Primary Examiner*—Lloyd A. Gall
*Attorney, Agent, or Firm*—Adams & Wilks

[57] ABSTRACT

A vehicle pedal lock comprises first and second members movable relative to one another and adapted for locking and unlocking engagement, and a lock assembly for locking the first and second members to one another. The first member has a shackle and at least one leg extending from the shackle. The shackle has an open end, a pair of generally parallel arms each having a terminal end, and a curved portion connecting the arms to one another. The second member has a tubular body lockable across the open end of the shackle, and at least two legs extending from the tubular body. The lock assembly comprises a pair of locking elements each provided at the terminal end of one of the arms of the shackle, a pair of openings each formed at an outer surface of the tubular body of the second member for receiving the locking element of one of the arms of the shackle, and a locking mechanism disposed in the tubular body of the second member for locking engagement with the locking elements of the arms of the shackle.

20 Claims, 3 Drawing Sheets

VEHICLE PEDAL LOCK

BACKGROUND OF THE INVENTION

1. Field of the Invention

The present invention relates generally to security devices and, more particularly, to a vehicle pedal lock for preventing the theft of vehicles.

2. Background Information

A wide variety of security devices have been proposed to deal with the problem of vehicle theft. Such security devices typically involve the immobilization of the gearshift stick, the steering wheel and/or a pedal of the vehicle and comprise various combinations of shackles, padlocks and chains. Some of these conventional security devices have proved comparatively easy to circumvent, while others require special fitting or wiring, which makes them expensive to manufacture and install.

Of the vast number of vehicle security devices available in the market, one popularly known removable steering wheel security device is the "THE CLUB"® which is, in many ways, typical of prior removable steering wheel security devices. Although these prior security devices have been advertised to prevent or deter automobile theft, such security devices have several shortcomings, and, in many cases, have failed to provide adequate security.

Many prior art removable steering wheel security devices, such as "THE CLUB"®, comprise a rigid elongated portion and a locking portion for temporarily securing the rigid elongated portion to the steering wheel. The locking portion typically involves a lock-and-key set, and openable jaws which are adapted to engage the rim of the steering wheel. The rigid elongated portion typically comprises a hard metallic bar or the like, which extends well beyond the rim of the steering wheel. When properly installed onto the rim of a steering wheel (i.e., locked in place), the elongated portion prevents full rotation of the steering wheel because, depending upon the design of the elongated portion and the make of the automobile, the elongated portion comes into contact with a fixed member of the automobile (e.g., the window, the door, the dashboard, the windshield, etc.).

However, the foregoing prior art steering wheel security devices have several shortcomings. First, since the proper operation of these prior art security devices depends on the adequacy of the locking portion to tightly secure to the steering wheel rim, and the strength of the elongated portion, such devices have an overdesigned, excessively strong lock and elongated portion constructed of excessively strong metal or composite materials. Second, in order to defeat or bypass such security devices, it is only necessary to cut (e.g., saw) the steering wheel rim at the point of attachment of such security devices. In particular, it is only necessary to make one or, at the most, two small cuts in the rim of the steering wheel. Once the rim of the steering wheel is cut, these prior art steering wheel security devices are quite easily removed and the automobile can readily be steered.

Moreover, the removal of prior art steering wheel security devices, such as "THE CLUB"®, can be readily accomplished by an unauthorized individual while the individual is situated completely within the vehicle and with the doors closed. Therefore, the design and manner of installation of such prior art steering wheel security devices facilitates its unauthorized removal because an unauthorized individual can remove the security device while inside the vehicle, completely out of view.

SUMMARY OF THE INVENTION

It is, therefore, an object of the present invention to provide a vehicle pedal lock for preventing the unauthorized operation of a clutch, brake and/or acceleration pedal of a vehicle in order to safeguard the vehicle against theft or unauthorized use.

Another object of the present invention is to provide a simple and inexpensive vehicle pedal lock which does not require special fitting or wiring and in use will be extremely difficult to circumvent.

Another object of the present invention is to provide a vehicle pedal lock which has a compact locking structure embodying a minimum number of parts and which is capable of quick and easy installation.

A further object of the present invention is to provide a vehicle pedal lock which prevents removal of the lock and protects the pedal arms from being cut by denying a thief access to the pedal arms.

A further object of the present invention is to provide a vehicle pedal lock which is not bulky or cumbersome, is easy to use, and is inexpensive in relation to its benefits.

Yet another object of the present invention is to provide a vehicle pedal lock which provides a simple detachable lock which may be easily carried and stored within the vehicle and is easy to manufacture.

The foregoing and other objects of the present invention are carried out by a vehicle pedal lock comprising first and second members relatively movable to one another and adapted for locking and unlocking engagement, and a lock assembly for locking the first and second members to one another.

In one aspect of the present invention, the first member comprises a shackle and at least one leg extending from the shackle. The shackle has an open end, a pair of generally parallel arms each having a terminal end, and a curved portion connecting the arms to one another. The second member has a tubular body lockable across the open end of the shackle, and at least two legs extending from the tubular body.

In another aspect of the present invention, the lock assembly preferably comprises a pair of locking elements each provided at the terminal end of one of the arms of the shackle, a pair of openings each formed at an outer surface of the tubular body of the second member for receiving the locking element of one of the arms of the shackle, and a locking mechanism disposed in the tubular body of the second member for locking engagement with the locking elements of the arms of the shackle.

In a further aspect of the present invention, the vehicle pedal lock has an adjusting mechanism for adjusting the distance between the tubular body of the second member and the curved portion of the first member prior to locking the tubular body across the open end of the shackle.

In another aspect of the present invention, the vehicle pedal lock further includes a pair of braces each having a first end connected to one of the arms of the shackle and a second end connected to the curved portion of the shackle.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangements and instrumentalities shown. In the drawings:

FIG. 3 is a partial perspective view of a vehicle pedal lock according to a second embodiment of the present invention.

DETAILED DESCRIPTION OF THE PREFERRED EMBODIMENTS

While this invention is susceptible of embodiments in many different forms, this specification and the accompanying drawings disclose only some specific forms as examples of the use of the invention. The invention is not intended to be limited to the embodiments as described, and the scope of the invention will be defined in the appended claims.

Figure 1:
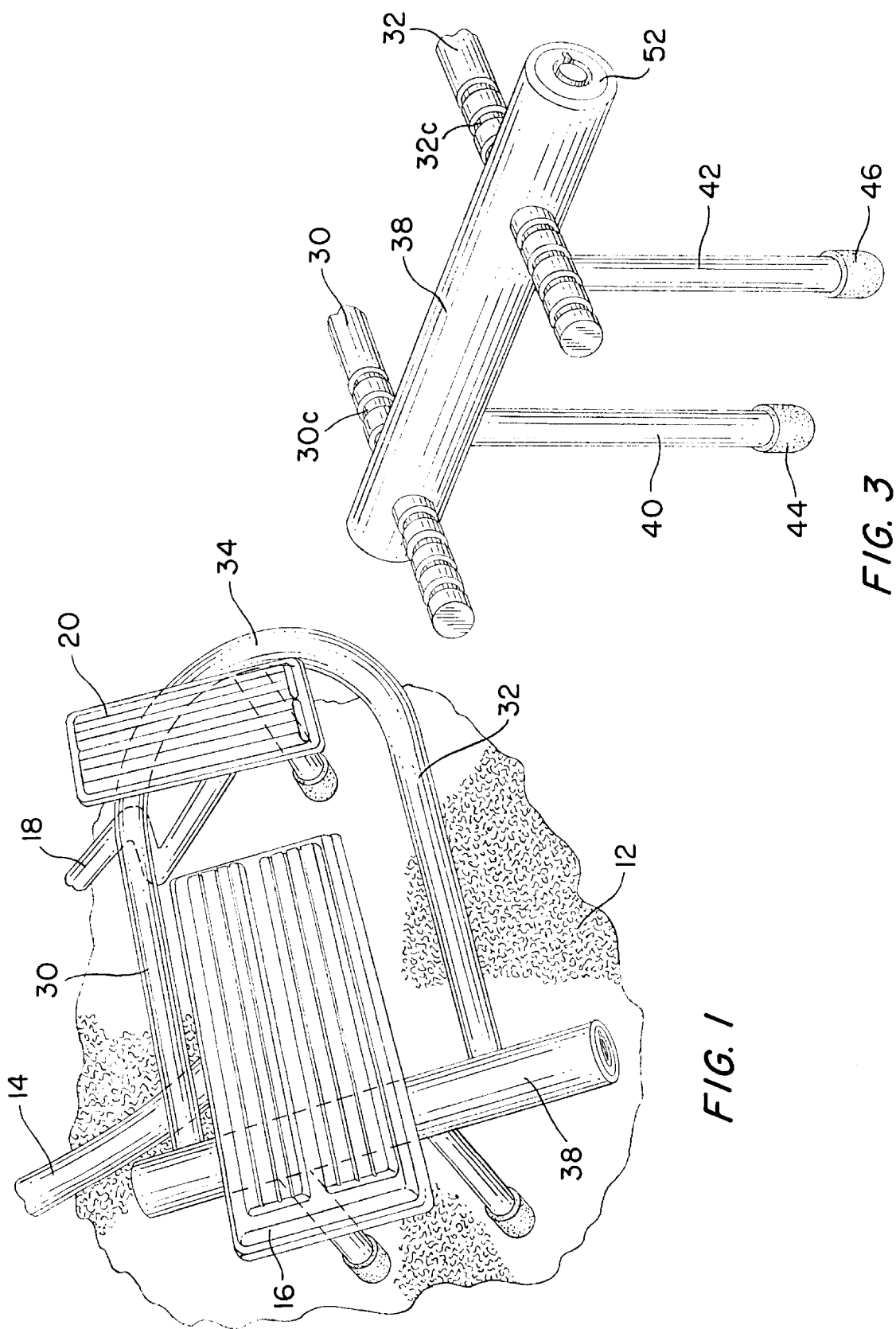
FIG. 1 is a schematic view of a vehicle pedal lock constructed in accordance with a first embodiment of the present invention.
Figure 2:
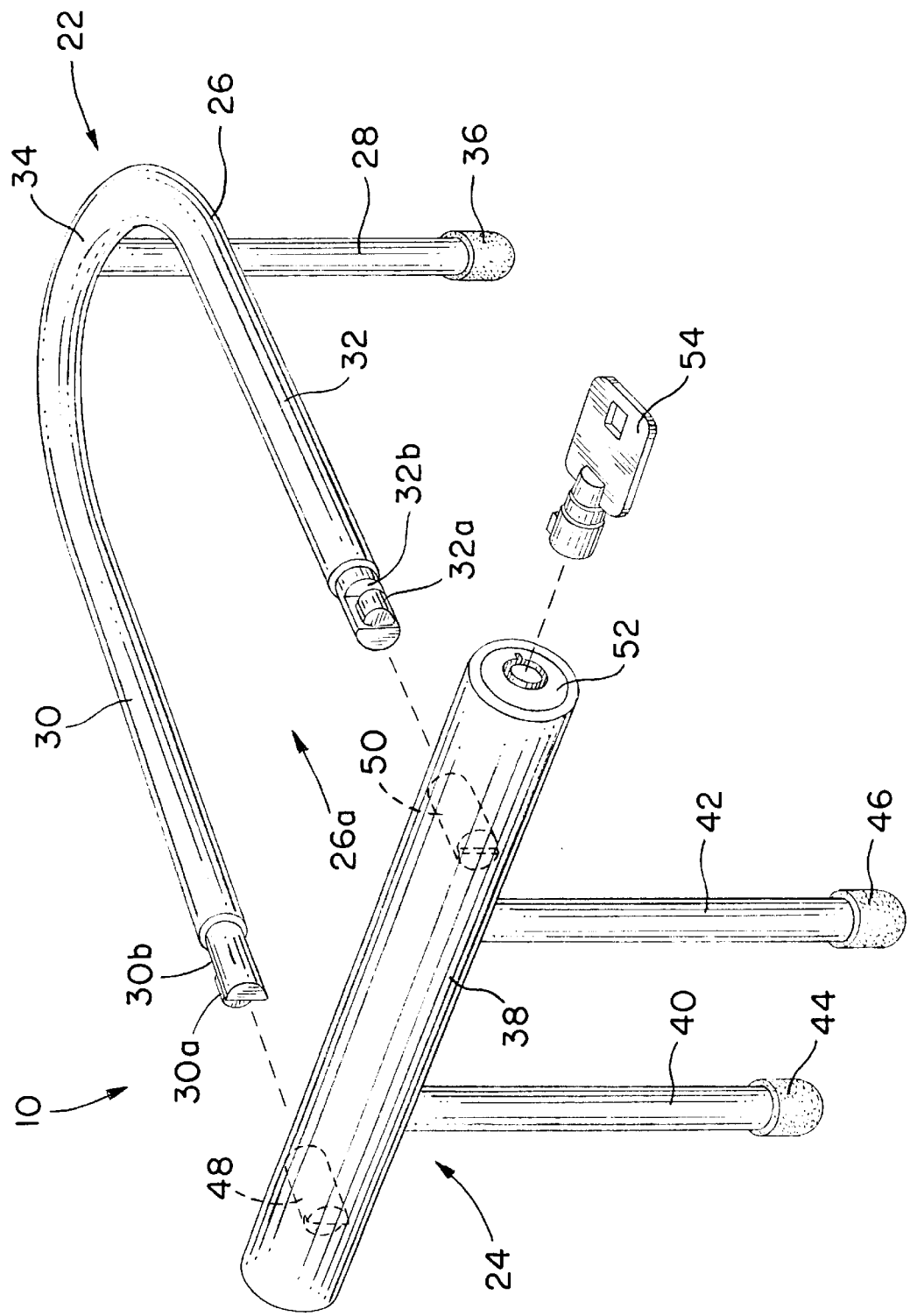
FIG. 2 is an exploded view in perspective of the vehicle pedal lock according to the first embodiment of the present invention.

Referring now to the drawings in detail, wherein like numerals are used to indicate like elements throughout, there is shown in FIGS. 1–2 a first embodiment of a pedal lock, generally designated at 10, according to the present invention. The pedal lock 10 is described with a specific application to a motor vehicle, such as automobiles, trucks and vans, for safeguarding the motor vehicle against theft or unauthorized use. However, it is understood by those of ordinary skill in the art that the invention is equally applicable as a security device for other purposes. The exemplary vehicle, as shown in FIG. 1, has a rigid support surface 12, such as a vehicle floor, a first pedal having a pedal arm 14 and a pedal foot plate 16 fixedly secured to one end of the pedal arm 14, and a second pedal having a pedal arm 18 and a pedal foot plate 20 fixedly secured to one end of the pedal arm 18. The pedal lock 10 is configured to be fitted about the pedal arms 14, 18 of the vehicle, between the foot plates 16, 20 of the pedals and the vehicle floor 12, to prevent depression of the pedal foot plates 16, 20 toward the vehicle floor 12.

In the embodiment shown in FIG. 1, the first and second pedals represent, for example, a brake pedal and an accelerator pedal, respectively, of the vehicle. However, it is understood that the pedal lock of the present invention could also be fitted about the arm of a clutch pedal, for example, between a foot plate of the clutch pedal and the vehicle floor to prevent depression of the clutch pedal foot plate toward the vehicle floor. It is also understood that the inventive pedal lock could also be fitted about only one of the brake pedal arm, accelerator pedal arm or clutch pedal arm, or around the arms of the clutch pedal and the brake pedal only, for example.

FIG. 2 shows an exploded view of the pedal lock 10 according to the first embodiment of the present invention. The pedal lock 10 comprises two separable components, namely, a first member 22 and a second member 24 to which the first member may be releasably locked.

The first member 22 comprises a shackle 26 and a leg 28 extending from the shackle opposite an open end 26a thereof. In this embodiment, the shackle 26 is a generally U-shaped body and is provided with a pair of generally parallel arms 30, 32 of substantially the same length and a curved portion 34 connecting the arms to one another. The leg 28 extends generally perpendicularly from the plane of the curved portion 34 of the shackle 26 and has a terminal end provided with a protective member 36, such as a snap-on cover, preferably made of a rubber or plastic material. The protective cover permits the first member 22 to stably sit on the vehicle floor 12 during use of the pedal lock 10. The shackle 26 and the leg 28 are preferably fabricated from solid cylindrical rod stock using high grade hardened steel which may be heat treated and should be sufficiently sturdy and thick to prevent deformation or severance thereof by a bolt cutter, a hacksaw, a lever, or other implement.

The arm 30 of the shackle 26 has a terminal end portion provided with locking elements including a ridge 30a and a groove 30b. Similarly, the arm 32 of the shackle 26 has a terminal end portion provided with locking elements including a ridge 32a and a groove 32b. The ridges 30a, 32a and the grooves 30b, 32b are adapted for locking engagement with corresponding locking elements (not shown) of a lock mechanism 52 associated with the second member 24 to releasably lock the first member 22 to the second member 24.

The second member 24 comprises a tubular body defining a cross member 38 lockable across the open end 26a of the shackle 26 of the first member 22, and a pair of legs 40, 42 extending generally perpendicularly from the cross member 38. Each leg 40, 42 has a terminal end provided with a protective member 44,46, respectively, preferably made of a plastic or rubber material. The cross member 38 is provided at an outer surface thereof with a pair of aligned openings 48, 50 spaced apart from one another by a distance corresponding to the distance between the legs 30,32 of the shackle 26 for receiving the terminal ends of the shackle arms 30,32, as denoted in dotted line in FIG. 2, so that the ridges 30a,32a and the grooves 30b,32b at the terminal end portions of the arms 30,32 can be brought into locking engagement with the corresponding locking elements of the lock mechanism 52 to releasably lock the first member 22 and the second member 24 to one another.

The shackle 26 and the legs 28 and 40,42 of the first member 22 and the second member 24, respectively, are preferably fabricated from solid cylindrical rod stock using a high grade hardened steel. The cross member 38 is preferably of hollow tubular construction and fabricated from a high grade hardened steel. Preferably, the cross member 38 is cylindrical in shape and has a diameter greater than the diameter of the rod stock used in making the legs 28, 40, 42 and the shackle 26. In practice, the shackle 26 and the legs 28, 40, 42 are fabricated, for example, from cold rolled steel stock having a diameter on the order of $5/16$ inch, and the cross member has a diameter of 1 inch. However, it is understood that different sized stock and/or hardened tool steel or other material having similar characteristics may be used to advantage.

Mounted within the cross member 38 is the lock mechanism 52, which preferably comprises a rotatable lock operated by a key 54 which is inserted through a keyway provided at a side surface of the cross member 38. The openings 48, 50 of the cross member 38 house the locking elements (not shown) of the lock mechanism 52 which are configured to mate with the ridges 30a, 32a and grooves 30b, 32b of the arms 30,32 of the shackle 26 when the first member 22 and the second member 24 are locked to one another.

In the illustrated embodiment, the lock 52 and the key 54 are preferably of the cylindrical type to maximize protection against the lock being picked. However, it is understood that other types of locks, such as magnetically-operated locks, combination locks, and the like, may be used in lieu of the rotatable lock 52. It is also understood that the keyway for operating the lock 52 may be provided at a peripheral portion of the outer cylindrical surface of the cross member 38 opposite the legs 40,42 in order to further facilitate access to the lock 52 during locking and unlocking of the pedal lock 10 by an authorized user.

To install the vehicle pedal lock 10 in the manner shown in the embodiment of FIG. 1, the first member 22 is positioned by fitting the open end 26a of the shackle 26 about the arm 14 of the brake pedal and the arm 18 of the accelerator pedal, between the pedal foot plates 16 and 20 and the vehicle floor 12, such that at least one portion of the shackle 26 engages a rear surface of the accelerator pedal foot plate 20 when the arm 18 is not in a depressed state, and the distal or free end of the leg 28 engages the vehicle floor 12. The second member 24 is then positioned by fitting the cross member 38 between the pedal foot plate 16 and the vehicle floor 12 such that the openings 48, 50 are in alignment with the terminal ends of the shackle arms 30,32, respectively, the cross member 38 engages a rear surface of the pedal foot plate 16 when the arm 14 is not in a depressed state, and the distal or free ends of the legs 40,42 engage the vehicle floor 12. The shackle 26 is then locked to the cross member 38 by first turning the lock mechanism 52 with the key 54 to the open or unlocked position. The terminal ends of the shackle arms 30, 32 are then inserted into the openings 48,50, as shown in dotted line in FIG. 2, by displacing the first and second members 22 and 24 towards one another. When the terminal ends of the shackle arms 30,32 are disposed within the openings 48,50, respectively, of the cross member 38, the lock mechanism 52 is turned to the locking position by turning the key 54 so that the locking elements of the lock mechanism 52 are positioned in locking engagement with the ridges 30a,32a and the grooves 30b, 32b of the shackle arms 30,32. The pedal lock 10 is now locked and the key 54 is then removed. The reverse procedure is employed when disconnecting the installed pedal lock 10.

By the foregoing construction and arrangement, as shown in FIGS. 1–2, it will be appreciated that the pedal lock 10 is secured against removal, and the brake, accelerator and/or clutch pedals cannot be depressed to brake, accelerate, or place the vehicle in gear, respectively, thereby preventing the vehicle from being removed under its own power. Furthermore, it is highly unlikely, if not impossible, for a thief to render the pedal lock 10 inoperative by forcing or cutting through the pedal lock 10, and, even if it were possible, such would be extremely time consuming, which would likely discourage a thief after a short period of time from attempting to render the pedal lock 10 inoperative. On the other hand, the installation and removal of the pedal lock 10 according to the present invention is extremely quick and convenient for the authorized user.

The shackle 26, the cross member 38 and the legs 28, 40 and 42 are not limited to any particular dimensions so long as they conform, when the pedal lock 10 is assembled, to the particular relative distance between the pedals and the distance between the vehicle floor and the pedals of the vehicle in which the pedal lock 10 is used. For example, in the embodiment of FIGS. 1–2, the distance between the upper surface of the shackle 26 and the terminal end of the leg 28 of the first member 22, the distance between the upper surface of the cross member 38 and the terminal end of the legs 40,42 of the second member 24, and the distance between the shackle curved portion 34 and the cross member 38 are such so as to permit the first member 22 and the second member 24 to fit snugly between the pedals 14, 18 and the vehicle floor 12 and to maintain the pedal lock steadily standing on the vehicle floor when the pedal lock is in a locked position. By this construction, once the pedal lock 10 is installed, it cannot be removed by merely tilting the pedal lock to clear the cross member 38 and the shackle 26 from the pedal foot plates 16,20.

Another embodiment of the pedal lock 10 according to the present invention, as shown in FIG. 3, comprises all of the elements described above with reference to the embodiment of FIGS. 1–2. However, in this embodiment the terminal end portions of the arms 30,32 of the shackle 26 are provided with locking elements including annular grooves 30c, 32c, respectively, for locking engagement with corresponding locking elements (e.g., mating ridge portions) of the lock mechanism 52. The annular grooves 30c, 32c constitute adjusting means for adjusting the distance between the shackle curved portion 34 and the cross member 38. This arrangement effectively permits adjustment of the length of pedal lock 10 (i.e., the length between the cross member 38 of the second member 24 and the curved portion 34 of the first member 22) to adapt its application to a wide range of vehicles having different dimensions between the pedals to be locked.

Figure 4:
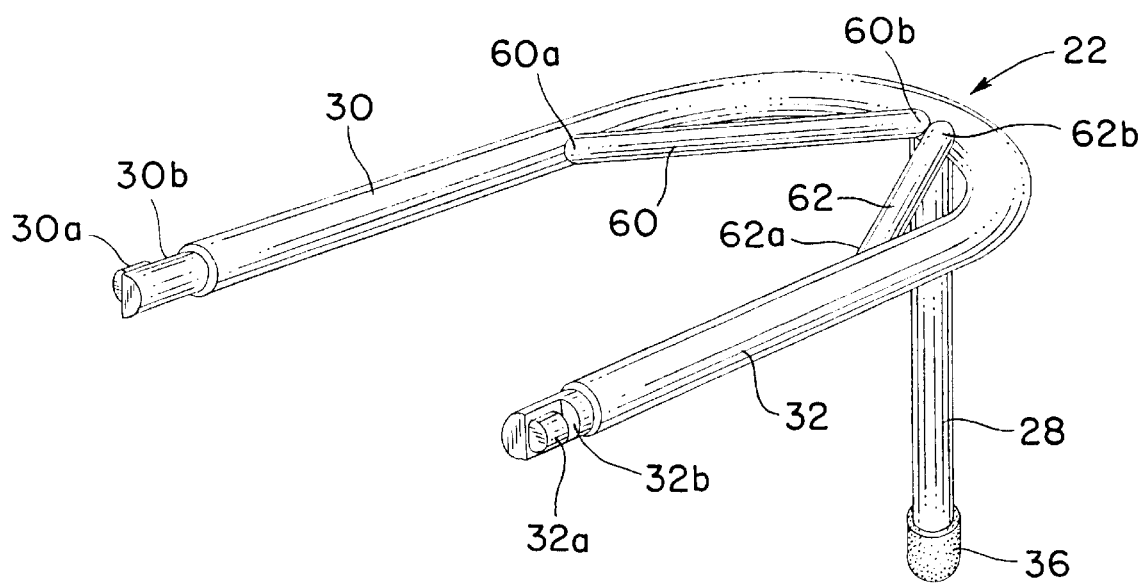
FIG. 4 is a perspective view of a first member of the vehicle pedal lock according to a third embodiment of the present invention.

FIG. 4 shows another embodiment of the present invention, in which a pair of braces 60, 62 are connected to the shackle 26 of the first member 22 to further prevent removal of the installed pedal lock 10 by tilting thereof to clear the shackle 26 from the foot plate of the pedal. The brace 60 has a first end 60a connected to the arm 30 and a second end 60b connected to the shackle curved portion 34. Similarly, the brace 62 has a first end 62a connected to the arm 32 and a second end 62b connected to the shackle curved portion 34. The second ends 60b, 62b of the braces 60, 62, respectively, are connected to the shackle curved portion 34 proximate a central portion thereof to define a V-shaped configuration. The braces 60, 62 are also preferably fabricated from solid cylindrical rod stock using a heat treated high grade hardened steel to prevent cutting or deformation thereof by a bolt cutter, a hacksaw, a lever, or the like.

The pedal lock according to the embodiment shown in FIG. 4 is installed substantially in the same manner set forth above with respect to the installation of the pedal lock of the embodiment shown in FIGS. 1–2. In the embodiment of FIG. 4, however, when the first member 22 is positioned in place, the braces 60, 62 are engaged with the under surface of the pedal foot plate (e.g., of the pedal arm 18 in FIG. 1) together with the portion of the shackle 26. After the first member 22 and the second member 24 are locked to one another, the pedal lock 10 is secured in place and cannot be removed by tilting thereof to clear the cross member 38 and the shackle 26 from the pedal foot plates 16 and 20.

Although in the foregoing embodiments of the present invention the shackle 26, the cross member 38 and the legs 28, 40 and 42 are shown having a circular cross-section, it is understood that the present invention is not limited to this cross-sectional configuration. For example, other cross-sectional configurations, such as rectangular, triangular, oval, pentagonal and hexagonal are suitable for the shackle 26, the cross member 38 and the legs 28, 40 and 42. Likewise, the material for the shackle 26, the cross member 38 and the legs 28, 40 and 42 is not limited to a metal, such as high grade hardened steel. Other materials, such as carbon fibers and composite materials, which exhibit high strength and lightweight characteristics, are suitable for the shackle 26, the cross member 38 and the legs 28, 40 and 42. However, the use of metal (e.g., high grade hardened steel) is preferred because of its strength and resistance to cutting, though other materials may be used if they are deemed suitable. Moreover, the parts of the pedal lock 10 may be plated to prevent rusting and are preferably covered with a layer of resilient material such as rubber, vinyl plastic or the like to prevent the lock parts from scratching the finished surfaces of the motor vehicle during use or storage of the pedal lock.

Although in the foregoing embodiments the first member 22 has been disclosed with one leg 28, it is understood that two or more legs may extend from the first member 22. For example, two legs may be provided on the first member 22, each extending from the shackle 26 near the point where each of the legs 30, 32 connect to the curved portion 34. Likewise, a single leg or a pair of legs may extend from the shackle 26 at an orientation other than perpendicular. Similarly, the legs 40, 42 may extend from the second member 24 at an orientation other than perpendicular, such as at an inclination thereof with the legs extending from a center portion of the cross member 38 to define an upside-down V-shape configuration. Alternatively, more than two legs may extend from the second member 24.

The vehicle pedal lock according to the present invention offers a design having a simple yet effective construction. The vehicle pedal lock is particularly suitable for a wide range of vehicles to prevent depression of the clutch, brake or accelerator pedals toward the vehicle floor and thereby prevent operation of the vehicle. The parts are not costly to manufacture and would be common to a wide range of vehicles. Other advantages of the design of the vehicle pedal lock according to the present invention are that it has a compact locking structure embodying a minimum number of parts, it is capable of easy installation and removal, and it offers good security.

From the foregoing description, it can be seen that the present invention comprises an improved vehicle pedal lock. It will be appreciated by those skilled in the art that obvious changes could be made to the embodiments described in the foregoing description without departing from the broad inventive concept thereof. For example, although the foregoing embodiments of the pedal lock have been described with a specific application to a vehicle, it will be appreciated that the foregoing embodiments are also suitable for other locking purposes. Additionally, other configurations are suitable for the shackle, the crosspiece and legs of the pedal lock without departing from the spirit and scope of the invention. It is understood, therefore, that this invention is not limited to the particular embodiments disclosed, but is intended to cover all modifications thereof which are within the scope and spirit of the invention as defined by the appended claims.

I claim:

1. A vehicle pedal lock, comprising:
   a first member having a shackle and at least one leg extending from the shackle, the shackle having an open end, a pair of generally parallel arms each having a terminal end, and a curved portion connecting the arms to one another;
   a pair of braces each having a first end connected to one of the arms of the shackle and a second end connected, to the curved portion of the shackle;
   a second member movable relative to the first member for locking and unlocking engagement therewith, the second member having a tubular body and at least two legs extending from the tubular body, the tubular body being lockable across the open end of the shackle; and
   locking means for releasably locking the first and second members to one another.

2. A vehicle pedal lock according to claim 1; wherein the leg of the first member and the legs of the second member extend generally perpendicular from the first member and the second member, respectively.

3. A vehicle pedal lock according to claim 1; wherein the leg of the first member extends from the curved portion of the shackle.

4. A vehicle pedal lock according to claim 1; wherein the locking means comprises a pair of locking elements each provided at the terminal end of one of the arms of the shackle, means defining a pair of openings each opening at an outer surface of the tubular body of the second member for receiving the locking element of a respective one of the arms of the shackle, and a lock mechanism disposed in the tubular body of the second member for locking engagement with the locking elements of the arms of the shackle.

5. A vehicle pedal lock according to claim 1; further comprising adjusting means for adjusting the distance between the tubular body of the second member and the curved portion of the first member prior to locking the tubular body across the open end of the shackle.

6. A vehicle pedal lock according to claim 5; wherein the adjusting means comprises a plurality of locking elements provided at least at the terminal end of each arm of the shackle.

7. A vehicle pedal lock according to claim 6; wherein the locking means comprises the locking elements of the arms of the shackle, a pair of openings each opening at an outer surface of the tubular body of the second member for receiving the locking elements of one of the arms of the shackle, and a locking mechanism disposed in the tubular body for locking engagement with the locking elements of the shackle.

8. A vehicle pedal lock according to claim 1; further comprising a protective member disposed at a terminal end of the leg of the first member and at a terminal end of each of the legs of the second member.

9. A security device for a vehicle having an accelerator pedal and a brake pedal for maintaining the pedals in a non-depressed state to prevent unauthorized driving of the vehicle, the security device comprising:
   accelerator-pedal engaging means for engaging with an accelerator pedal of a vehicle, the accelerator-pedal engaging means comprising a shackle having a surface engageable with the acceleration pedal, an open end, a pair of generally parallel arms each having a terminal end, and a curved portion connecting the arms to one another;
   a pair of braces engageable with the accelerator pedal, each of the braces having a first end connected to one of the arms of the shackle and a second end connected to the curved portion of the shackle;
   brake-pedal engaging means for engaging with a brake pedal of the vehicle, the brake-pedal engaging means comprising a tubular body for engaging with the brake pedal; and
   support means for supporting the accelerator-pedal engaging means and the brake-pedal engaging means so that they engage the accelerator pedal and the brake pedal to maintain the pedals in a non-depressed state, the support means comprising at least one leg extending from the shackle and at least two legs extending from the tubular body.

10. A security device according to claim 9; further comprising locking means for releasably locking the accelerator-pedal engaging means and the brake-pedal engaging means to one another.

11. A security device according to claim 9; further comprising locking means for releasably locking the shackle and the tubular body to one another.

12. A security device according to claim 9; further comprising locking means for releasably locking the tubular body across the open end of the shackle.

13. A security device according to claim 12; wherein the locking means comprises a pair of locking elements each provided at the terminal end of one of the arms of the shackle, means defining a pair of openings each opening at an outer surface portion of the tubular body for receiving the locking element of a respective one of the arms of the shackle, a lock mechanism disposed in the tubular body for locking engagement with the locking elements of the arms of the shackle, and means for actuating and releasing the lock mechanism.

14. A security device according to claim 12; further comprising adjusting means for adjusting the distance between the tubular body and the curved portion of the shackle prior to locking the tubular body across the open end of the shackle.

15. A vehicle pedal lock, comprising:
   a first member having an open end, a pair of generally parallel arms and a curved portion connecting the arms to one another;
   a pair of braces each having a first end connected to one of the arms of the first member and a second end connected to the curved portion of the first member;
   a second member movable relative to the first member for locking and unlocking engagement with the open end of the first member; and
   a locking device for releasably locking the first and second members to one another.

16. A vehicle pedal lock according to claim 15; further comprising support means for supporting the first and second members so that they engage an accelerator pedal and a brake pedal of a vehicle to maintain the pedals in a non-depressed state.

17. A vehicle pedal lock according to claim 16; wherein the support means comprises at least one leg extending from the first member, and at least two legs extending from the second member.

18. A vehicle pedal lock according to claim 17; wherein the leg of the first member extends from the curved portion thereof.

19. A vehicle pedal lock according to claim 17; wherein the leg of the first member and the legs of the second member extend generally perpendicular from the first member and the second member, respectively.

20. A vehicle pedal lock according to claim 15; wherein the second member comprises a generally tubular-shaped body.

* * * * *